(12) United States Patent
Arnold et al.

(10) Patent No.: US 10,894,725 B1
(45) Date of Patent: Jan. 19, 2021

(54) CONTROL PROCESS FOR WASTEWATER TREATMENT SYSTEM

(71) Applicant: Tangent Company LLC, Chagrin Falls, OH (US)

(72) Inventors: Adam Joseph Arnold, Aurora, OH (US); David Alan Barski, Solon, OH (US); Brendan James Matheny, Solon, OH (US); Ray Allen Lillback, Mantua, OH (US)

(73) Assignee: TANGENT COMPANY LLC, Chagrin Falls, OH (US)

( * ) Notice: Subject to any disclaimer, the term of this patent is extended or adjusted under 35 U.S.C. 154(b) by 122 days.

(21) Appl. No.: 16/156,700

(22) Filed: Oct. 10, 2018

Related U.S. Application Data

(60) Provisional application No. 62/570,827, filed on Oct. 11, 2017.

(51) Int. Cl.
*B01D 61/02* (2006.01)
*B01D 61/12* (2006.01)
(Continued)

(52) U.S. Cl.
CPC ............ *C02F 1/008* (2013.01); *B01D 61/022* (2013.01); *B01D 61/025* (2013.01); *B01D 61/12* (2013.01); *B01D 61/145* (2013.01); *B01D 61/22* (2013.01); *B01D 61/58* (2013.01); *B01D 65/02* (2013.01); *C02F 9/00* (2013.01); *B01D 2311/12* (2013.01); *B01D 2311/14* (2013.01); *B01D 2311/2619* (2013.01); *B01D 2311/2692* (2013.01); *B01D 2313/243* (2013.01); *B01D 2317/02* (2013.01); *B01D 2321/04* (2013.01);
(Continued)

(58) Field of Classification Search
None
See application file for complete search history.

(56) References Cited

U.S. PATENT DOCUMENTS 5,494,573 A    2/1996  Schoenmeyr et al.
6,074,551 A    6/2000  Jones et al.
(Continued)

OTHER PUBLICATIONS

Filmtec Membranes System Operation: Record Keeping; Tech Manual Excerpt; Dow; Form No. 609-02084-0905, pp. 1-4.
(Continued)

*Primary Examiner* — Bradley R Spies
(74) *Attorney, Agent, or Firm* — Pearne & Gordon LLP

(57) ABSTRACT

Process steps for monitoring the performance of a wastewater treatment system having a series of filtration units and optionally one or more disinfection units, controlling the operation of the filtration units, and controlling the operation of one or more maintenance operations that can be performed on the filtration units as a result of the monitoring. The wastewater treatment system can be operated without breaking pressure between the filtration units. Monitoring the performance of the wastewater treatment system can include using the water quality at various points in the system as an indicator of clogging or integrity issues within the filtration units. Sensors can be configured to measure properties of wastewater both upstream and downstream of each filtration unit, and the measured properties can be used to determine whether the filtration unit is performing adequately.

16 Claims, 3 Drawing Sheets

(51) Int. Cl.
  *B01D 61/14* (2006.01)
  *B01D 61/22* (2006.01)
  *B01D 61/58* (2006.01)
  *C02F 1/00* (2006.01)
  *C02F 1/44* (2006.01)
  *C02F 1/50* (2006.01)
  *C02F 9/00* (2006.01)
  *B01D 65/02* (2006.01)
  *C02F 1/32* (2006.01)

(52) U.S. Cl.
  CPC ............ *B01D 2321/16* (2013.01); *C02F 1/32* (2013.01); *C02F 1/441* (2013.01); *C02F 1/444* (2013.01); *C02F 1/50* (2013.01); *C02F 2201/002* (2013.01); *C02F 2209/02* (2013.01); *C02F 2209/03* (2013.01); *C02F 2209/05* (2013.01); *C02F 2209/29* (2013.01); *C02F 2209/40* (2013.01); *C02F 2303/04* (2013.01); *C02F 2303/16* (2013.01)

(56) References Cited

U.S. PATENT DOCUMENTS

| | | | | |
|---|---|---|---|---|
| 6,908,546 B2* | 6/2005 | Smith | ................ | A61M 1/1674 210/137 |
| 7,632,410 B2 | 12/2009 | Heiss | | |
| 8,658,043 B2 | 2/2014 | Wilkins et al. | | |
| 9,314,742 B2 | 4/2016 | Goodfellow | | |
| 2004/0050790 A1* | 3/2004 | Baarman | ................ | B01D 61/10 210/650 |
| 2009/0152178 A1 | 6/2009 | Heiss | | |
| 2011/0297844 A1* | 12/2011 | Vecziedins | ................ | H01J 5/62 250/432 R |
| 2014/0326665 A1* | 11/2014 | Feldstein | ................ | C02F 1/008 210/637 |
| 2020/0047126 A1* | 2/2020 | Peichel | ................ | B01D 61/145 |

OTHER PUBLICATIONS

Reclamation Managing Water in the West; U.S. Department of the Interior Bureau of Reclamation Research Development Office; Research and Development Office Science and Technology Program Final Report ST-2014-1759-01; Dec. 2014.

What is Membrane Performance Normalization?; Hydranautics High Performance Membrane Productions; Lenntech; Jan. 23, 2001, pp. 1-6.

Membrane Process Optimization Technology; United States Department of the Interior Bureau of Reclamation, Denver Office, Technical Services Center, Environmental Services Division, Water Treatment Engineering and Research Group; Assistance Agreement 02-FC-81-0833; Aug. 2003.

Operation, Maintenance and Handling Manual for membrane elements; Toray Industries, Inc, Membrane Products Department; Jan. 2005.

* cited by examiner

CONTROL PROCESS FOR WASTEWATER TREATMENT SYSTEM

BACKGROUND

Wastewater treatment systems can be used to improve the water quality of wastewater. For example, wastewater treatment systems can be used to generate water that meets potable water standards or to generate water that meets environmental discharge standards. As used herein, wastewater generally refers to a water-containing liquid that can be treated via filtration and optionally additional treatment operations to improve the water quality. Depending on the source, wastewater can contain high levels of solids and organic materials, and can possibly include pathogens. Wastewater treatment systems can include advanced purification treatment units, such as advanced-filtration operations and disinfection operations, which remove solids, organics, and pathogens in wastewater to meet acceptable standards. If necessary, wastewater treatment systems can also include preliminary purification treatment units, such as biological operations, prior to advanced purification processes, which substantially reduce solids, organic, and pathogens in the wastewater, in order to ease the load on the advanced purification treatment units.

Over time, however, the performance of the treatment units in a wastewater treatment system can deteriorate, resulting in water output that does not meet applicable standards. Unfortunately, testing the wastewater to ensure that applicable standards are met does not provide contemporaneous feedback. It is therefore desirable to monitor the status of the treatment units as an indication that the water output of the wastewater treatment system continues to meet applicable standards. However, manually monitoring the advanced purification treatment units is time consuming and potentially labor intensive. Thus, alternative methods for monitoring wastewater treatment system treatment units are desirable.

SUMMARY

Described herein are process steps for monitoring the performance of a wastewater treatment system having a series of filtration units and optionally one or more disinfection units, controlling the operation of the filtration units, and controlling the operation of one or more maintenance operations that can be performed on the filtration units as a result of the monitoring. Also described herein is a method of operating a series of filtration units without breaking pressure between the filtration units.

Monitoring the performance of the wastewater treatment system can include using the water quality at various points in the system as an indicator of clogging or integrity issues within the filtration units. Specifically, sensors can be configured to measure properties of wastewater both upstream and downstream of each filtration unit, and the measured properties can be used to determine whether the filtration unit is performing adequately. Monitoring the performance of the wastewater treatment system can also include monitoring the disinfection units, if present, and using the monitored information as an indicator of the performance of the disinfection units and/or the performance of the filtration units.

In a first aspect, there is provided a method of treating wastewater with a wastewater treatment system that includes: a wastewater source, a pressurization pump for pressurizing and pumping wastewater from the wastewater source, an ultrafiltration unit downstream of the pressurization pump having a feed side and a permeate side, a first pass reverse osmosis unit downstream of the ultrafiltration unit having a feed side, a permeate side, and a first pass recovery loop, a second pass reverse osmosis unit downstream of the first pass reverse osmosis unit having a feed side, a permeate side, and a second pass recovery loop. The method involves operating the pressurization pump to feed wastewater to the feed side of the ultrafiltration unit, though the ultrafiltration unit to the permeate side of the ultrafiltration unit, to the feed side of the first pass reverse osmosis unit, through the first pass reverse osmosis unit to the permeate side of the first pass reverse osmosis unit, to the feed side of the second pass reverse osmosis unit, through the second pass reverse osmosis unit to the permeate side of the second pass reverse osmosis unit to produce treated wastewater without secondary pressurization pumps; continuously determining a normalized transmembrane pressure through the ultrafiltration unit, a normalized transmembrane pressure through the first pass reverse osmosis unit, and a normalized transmembrane pressure through the second pass reverse osmosis unit while the pressurization pump is operated; continuously comparing the normalized transmembrane pressures to upper and lower limits for normalized transmembrane pressures while the pressurization pump is being operated; continuing the operation of the pressurization pump if the normalized transmembrane pressures are within the upper and lower limits; and ceasing the operation of the pressurization pump if the normalized transmembrane pressures are outside the upper and lower limits.

In a second aspect, there is provided a method of treating wastewater with the wastewater treatment system of the first aspect. The method involves operating the pressurization pump to feed wastewater to the feed side of the ultrafiltration unit, though the ultrafiltration unit to the permeate side of the ultrafiltration unit, to the feed side of the first pass reverse osmosis unit, through the first pass reverse osmosis unit to the permeate side of the first pass reverse osmosis unit, to the feed side of the second pass reverse osmosis unit, through the second pass reverse osmosis unit to the permeate side of the second pass reverse osmosis unit to produce treated wastewater without secondary pressurization pumps; continuously determining a normalized permeate conductivity of the first pass reverse osmosis unit, and a normalized permeate conductivity of the second pass reverse osmosis unit while the pressurization pump is operated; continuously comparing the normalized permeate conductivities to upper limits for normalized permeate conductivities while the pressurization pump is being operated; continuing the operation of the pressurization pump if the normalized permeate conductivities are below the upper limits; and ceasing the operation of the pressurization pump if the normalized permeate conductivities are above the upper limits.

DETAILED DESCRIPTION

Figure 1:
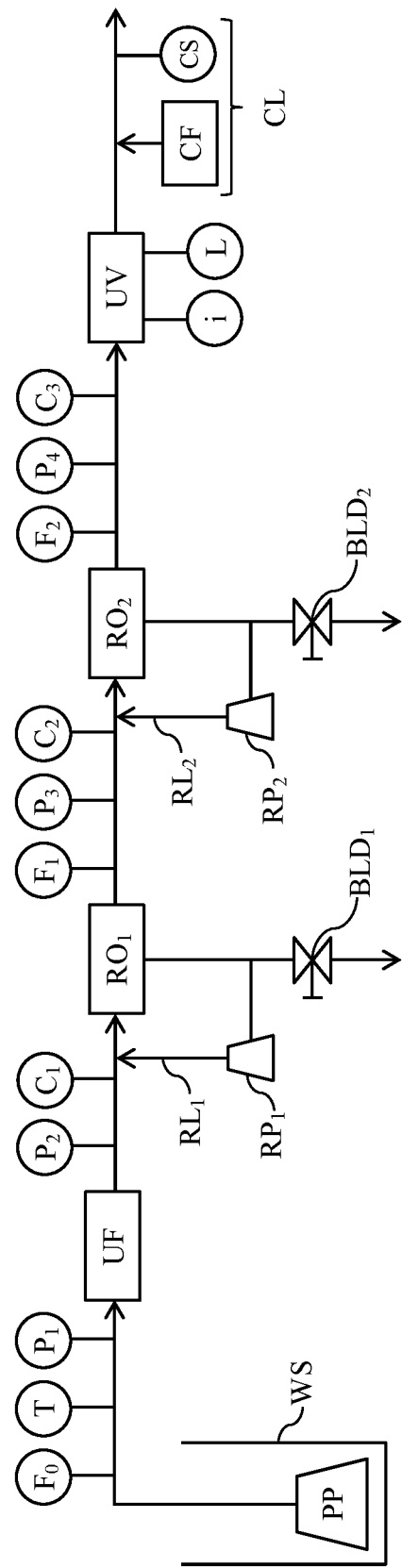
FIG. 1 shows a wastewater treatment system according to a first embodiment.

Detailed below is a wastewater treatment system having multiple treatment units for treating wastewater such that the water quality thereof is improved to meet desirable standards. Additionally, there is a control system for operating the wastewater treatment system. The control system monitors the performance of the treatment units in the wastewater treatment system and operates the wastewater treatment system based on the monitored performance. The wastewater treatment system includes advanced purification treatment units, and optionally one or more preliminary purification treatment units.

The preliminary purification treatment units can include primary treatment units, such as sedimentation and flotation, which result in a large amount of solids separating from the wastewater via settling or floating, secondary treatment units where the levels of dissolved or suspended organic compounds are reduced, and some tertiary treatment units, such as biological nutrient removal where remaining organic- and nitrogen-containing compounds are converted to natural ozone gasses that can be emitted from the system, as well as some filtration operations such as sand filtration, activated carbon filtration, as microfiltration, and ultrafiltration, to remove additional solid materials.

The advanced purification treatment units produce treated water that can be safe for environmental discharge or safe for drinking standards. The advanced purification treatment units can include a series of advanced-filtration operations to further separate water from non-water components, as well as disinfection operations to provide additional disinfection for any undesirable materials passing through the advanced-filtration operations. The advanced-filtration operations include membrane-based operations that filter wastewater in order to remove contaminants therein using, e.g. membrane surfaces. During operation of the advanced-filtration operations, an applied pressure forces wastewater through the membrane surfaces which prevent certain non-water components from passing through. The applied pressure is typically created with a pressurization pump.

The advanced-filtration operations can include at least one ultrafiltration unit and at least one reverse osmosis unit. Reverse osmosis units are filtration units that includes semi-permeable membrane surfaces that allow wastewater to pass therethrough as permeate and prevents solutes and dissolved or suspended solids from passing therethrough, collecting them as concentrate. Reverse osmosis membrane surfaces allow wastewater to pass therethrough as a result of applied pressure, removing organic material above a specific molecular weight therefrom and is an physical barrier for solids and pathogens. However, if wastewater with large amounts of solids is fed to a reverse osmosis unit, the solids can accumulate on the membrane surfaces, negatively affecting performance.

Ultrafiltration units are size-exclusion filtration units that include semi-permeable membrane surfaces that allow wastewater and other components of small size to pass therethrough as permeate while preventing suspended solids and solutes of high molecular weight from passing therethrough and collecting them as concentrate. Ultrafiltration units can therefore significantly reduce the amount of larger solids in wastewater. Thus, including at least one ultrafiltration unit upstream of a reverse osmosis unit can reduce the amount of larger solids that can accumulate on the membrane surfaces of the reverse osmosis unit.

Nonetheless, over time, both ultrafiltration units and reverse osmosis units can be negatively affected by a variety of factors, including the accumulation of contaminants on their membrane surfaces. These filtration units can be designed in ways to minimize contaminant accumulation, e.g. by designing feed streams to flow across the membrane surfaces thereof producing a scouring effect. However, eventually the accumulation of contaminants reaches a point where the contaminants need to be removed by alternative means. To remove these contaminants from the membrane surface, maintenance operations (i.e., cleaning operations) can be performed such as backwashing or chemical cleaning. Thus, when the performance of a filtration unit declines in a way that indicates contaminants have accumulated on membranes surfaces of filtration units, one or more maintenance operations can be performed in order to increase the performance. In addition to being clogged with contaminants, there can be integrity issues with the membrane surfaces in the form of breakages sealing gaps, allowing contaminants to bypass the membrane surface. If a wastewater treatment system is being used to produce drinking water or water that is discharged to the environment, it is important to ensure that the integrity of system is not comprised by a broken or unsealed membrane surface that might allow pathogens or other undesired and harmful components to pass through unfiltered. Therefore, when membrane surfaces break or become unsealed, they should be replaced in order to ensure the integrity of the filtration units.

Because manual checking a filtration unit to see whether a maintenance operation needs to be performed or whether a membrane surface needs to replaced is time consuming and labor intensive, it is desirable to monitor the performance of the filtration units without using manually checking the filtration units.

When membrane surfaces are clogged, the difference between the pressure of the wastewater on the feed side of the membrane surfaces compared to the pressure of the wastewater on the permeate side of the membrane surfaces (e.g., transmembrane pressure) will increase, assuming that the same flow rate. This is a result of there being less membrane surface area for wastewater to pass through, causing a pressure build-up on the feed side of the membrane surfaces and a pressure decrease on the permeate side of the membrane surfaces. Furthermore, when there is an integrity issue with the membrane surfaces, the transmembrane pressure will decrease, assuming that the same flow rate, as a result of wastewater bypassing the membrane surfaces such that the pressure on the permeate side of the membrane surfaces approach the pressure on the feed side of the membrane surfaces. Thus, if the transmembrane pressure for a filtration unit is low, e.g., lower than a predetermined threshold, it might be indicative that there is a hole in one or more membrane surfaces or that one or more membrane surfaces re not sealed properly, allowing wastewater to bypass the membrane. If the transmembrane pressure is high, e.g., higher than a predetermined threshold, it might be indicative that one or more membrane surfaces are clogged due to accumulated contaminants. The predetermined threshold can be a percentage change from the baseline transmembrane pressure, which is determined when the wastewater treatment system is first operated with the current membranes installed in the filtration unit. If influent water quality conditions substantially change, baseline transmembrane pressure should be reset.

Additionally, when there is an integrity issue in a membrane unit, e.g. a hole in a membrane surface or sealing issue, solids can the membrane surfaces and pass to the permeate sides thereof. The amount of dissolved solids in wastewater can be determined by the conductivity of the wastewater. If there is an integrity issue in a membrane unit, then the conductivity on the permeate side of the membrane unit will increase, assuming the same feed conductivity.

Thus, if the permeate conductivity for a filtration unit is high, e.g., higher than a predetermined threshold, it might be indicative that there is a hole in one or more membrane surfaces or that one or more membrane surfaces are not sealed properly, allowing wastewater to bypass the membrane. The predetermined threshold can be a percentage change from the baseline permeate conductivity, which is determined when the wastewater treatment system is first operated with the current membranes installed in the filtration unit. If influent water quality conditions substantially change, baseline permeate conductivities should be reset.

However, both transmembrane pressure and permeate conductivity can be affected by factors other than membrane surfaces that are clogged or have integrity issues. Specifically, and as discussed in more detail below, regarding transmembrane pressure, a change in temperature of the wastewater affects the pressure of the wastewater; a change in flow rate of the wastewater affects the pressure of the wastewater; and changes in the electrical conductivity of the wastewater affects the pressure of the wastewater. Regarding permeate conductivity, a change in a change in temperature of the wastewater the conductivity of the wastewater; a change in flow rate of the wastewater affects the conductivity of the wastewater; and changes in the feed conductivity of the wastewater to a filtration unit affects the permeate conductivity of the wastewater from a filtration unit. Therefore, in order to account for changes in these properties of the wastewater, the transmembrane pressure and permeate conductivity should be normalized, i.e. adjusted to the baseline conditions of the system. More specifically, the normalized transmembrane pressure and permeate conductivity are based on the measured transmembrane pressures and permeate conductivities, adjusted for the above-mentioned factors.

To determine the normalized transmembrane pressure and permeate conductivity, the wastewater treatment system can include various sensors for measuring properties of the wastewater corresponding to the above-mentioned factors before and after each filtration unit. The wastewater treatment system can further include a controller for controlling the operation of the wastewater treatment system, e.g. by controlling the system's pumps, valves, and other components. The controller can also be connected to the various sensors for measuring properties of the wastewater and can be configured with logic for determining the normalized transmembrane pressure each filtration unit and permeate conductivity of each reverse osmosis unit from the properties measured by the sensors. Additionally, the controller can be configured to shut down the wastewater treatment system if the normalized transmembrane pressure of any filtration unit and permeate conductivity of any reverse osmosis unit indicated that any of the membrane surfaces are clogged or have integrity issues such that the water effluent of the system might be compromised. If the wastewater treatment system includes backwashing or cleaning operations, the controller can perform these operations while the wastewater treatment system is shut down and then turn the wastewater treatment system back on once the backwashing or cleaning operations are complete.

As discussed above, the advanced-filtration operations act as a physical barrier for pathogens and thus typically provide for sufficient disinfection for wastewater. However, in the event that some pathogens bypass the advanced-filtration operations without the controller determining that there is an integrity issue, disinfection operations can provide additional disinfection. Disinfection operations can include ultraviolet-light disinfection and chlorination. Ultraviolet-light disinfection involves an ultraviolet-light unit that utilizes at least one ultraviolet bulb that produces ultraviolet light, which can disrupt DNA of pathogenic microorganisms to disinfect wastewater. Chlorination involves feeding chlorine via a chlorinator to wastewater to kill bacteria and other microorganisms in the wastewater.

Like the advanced-filtration operations, it is important to ensure that the ultraviolet-light unit is operating effectively without manually monitoring it. Therefore, in order to ensure an ultraviolet-light unit is operating effectively, it is desirable to measure the properties of the bulbs used therein, such as luminescence and current draw. The controller can thus be connected to the ultraviolet-light unit such that it can shut down the wastewater treatment system if it detects that the ultraviolet-light unit is not operating effectively.

The chlorinator can be configured to feed chlorine based upon on the condition of the wastewater. Specifically, the wastewater treatment system can include a chlorine sensor for measuring the chlorine levels in the wastewater. The chlorine sensor and chlorinator can be connected to the controller such that chlorine is fed to the wastewater to maintain a particular chlorine level within the wastewater that is effective for disinfecting the wastewater. As chlorine disinfects wastewater by killing bacteria or other microorganisms, levels in the wastewater decrease. Thus, if there are high levels of pathogens in the wastewater requiring disinfection, the chlorinator will feed higher amounts of chlorine. Additional components, such as ammonia, can also consume chlorine, resulting in higher amounts of chlorine being fed to the wastewater. If the amount of chlorine fed by the chlorinator over a specific period of time is above a predetermined amount, the controller can be configured to interpret the system has having an integrity issue and can shut down the system.

Figure 3:
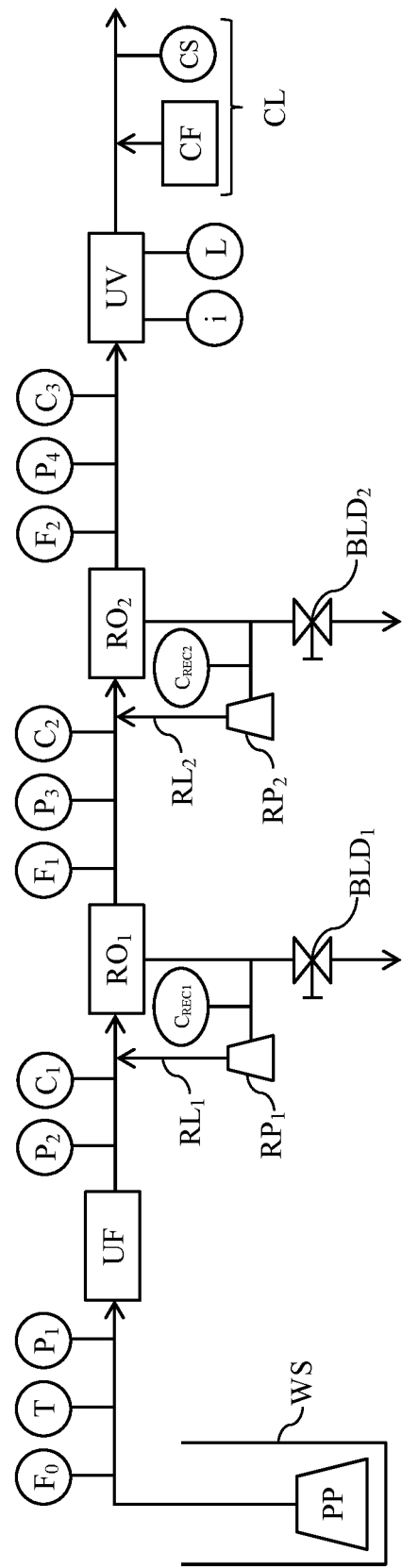
FIG. 3 shows a wastewater treatment system according to a second embodiment.

As depicted in FIGS. 1 and 3, the wastewater treatment according to the first and second embodiments include three filtration units: an ultrafiltration unit ("UF"), a first pass reverse osmosis unit ("$RO_1$"), and a second pass reverse osmosis unit ("$RO_2$"), as well as an ultraviolet-light unit ("UV") and a chlorinator ("CL"). A pressurization pump ("PP") pumps wastewater from a wastewater source ("WS") to the filtration units. The wastewater source can be any source of wastewater, including a wastewater storage tank or a series of additional wastewater treatment units such as primary purification treatment units. The system is configured such that the PP can feed through the UF, the $RO_1$, and the $RO_2$ without secondary pressurization pumps arranged downstream of the PP and upstream of the UF, the $RO_1$, or the $RO_2$. Utilizing a single PP to provide constant flow through the entire filtration system allows the monitoring of all filtration units without breaking pressure between the units, for example, having separate booster or supply pumps for each filter. A single PP that provides wastewater flow and pressure through all filtration units minimizes mechanical and programming complexity for the filtration system. As depicted, the PP is directly connected to the UF with piping. However, additional operations can be interposed between the PP and the UF. The UF includes membrane surfaces that allow wastewater and other components of small size to pass therethrough from a feed side to a permeate side thereof while preventing suspended solids and solutes of high molecular weight from passing therethrough and collecting them as concentrate. The UF permeate thus contains a reduced amount of solids and solutes of high molecular weight compared to the UF feed. The UF concentrate can be periodically disposed through an outlet.

Downstream of the UF is the $RO_1$. As depicted, the UF is directly connected to the $RO_1$ with piping. However, additional operations can be interposed between the UF and the $RO_1$. The UF permeate proceeds to the $RO_1$. The $RO_1$ includes membrane surfaces that allow wastewater to pass therethrough from a feed side to a permeate side thereof while preventing solutes and dissolved or suspended solids from passing therethrough, collecting them as concentrate. The $RO_1$ permeate includes water and little or none of the solutes or solids from the $RO_1$ feed. The $RO_1$ concentrate includes water and most or all of the solutes and solids from the $RO_1$ feed. A portion of the $RO_1$ concentrate is bled off through a first pass bleed valve ("$BLD_1$") while the remainder is recirculated through a first pass recovery loop ("$RL_1$") to the feed side of the $RO_1$. The $RL_1$ increases the water recovery of the $RO_1$. A first pass recirculation pump ("$RP_1$") drives $RO_1$ concentrate through the $RL_1$ and feeds it the feed side of the $RO_1$, where it is combined with the wastewater proceeding from the UF. The $BLD_1$ prevents excessive build-up of dissolved solids in the $RL_1$. The RP' produces a set, known flow rate ("$F_{REC1}$") within the $RL_1$, and the $BLD_1$ produces a set, known flow rate $F_{BLD1}$.

Downstream of the $RO_1$ is the $RO_2$. As depicted, the $RO_1$ is directly connected to the $RO_2$ with piping. However, additional operations can be interposed between the $RO_1$ and the $RO_2$. The $RO_1$ permeate proceeds to the $RO_2$. The $RO_2$ includes membrane surfaces that allow wastewater to pass therethrough from a feed side to a permeate side thereof while preventing solutes and dissolved or suspended solids from passing therethrough, collecting them as concentrate. The $RO_2$ permeate includes water and little or none of the solutes or solids from the $RO_2$ feed. The $RO_2$ concentrate includes water and most or all of the solutes and solids from the $RO_2$ feed. A portion of the $RO_2$ concentrate is bled off through a first pass bleed valve ("$BLD_2$") while the remainder is recirculated through a first pass recovery loop ("$RL_2$") to the feed side of the $RO_2$. The $RL_2$ increases the water recovery of the $RO_2$. A first pass recirculation pump ("$RP_2$") drives $RO_2$ concentrate through the $RL_2$ and feeds it the feed side of the $RO_2$, where it is combined with the wastewater proceeding from the $RO_1$. The $BLD_2$ prevents excessive build-up of dissolved solids in the $RL_2$. The $RP_2$ produces a set, known flow rate ("$F_{REC2}$") within the $RL_2$, and the $BLD_2$ produces a set, known flow rate $F_{BLD2}$.

Downstream of the $RO_2$ is the UV. As depicted, the $RO_2$ is directly connected to the UV with piping. However, additional operations can be interposed between the $RO_2$ and the UV. The UV includes at least one ultraviolet bulb that produces ultraviolet light, causing disruption of the DNA of pathogenic microorganisms to disinfect the wastewater.

Downstream of the UV is the CL. The CL includes a chlorine sensor ("CS") and a chlorine feeder ("CF"). The CS measures the chlorine levels in the wastewater and the CF feeds chlorine to the wastewater if the chlorine level measured by the CS is below a target level. This chlorine kills bacteria and other microorganisms remaining in the wastewater. Chlorine can also be consumed by other contaminants in the wastewater. For example, chlorine can reacts with ammonia in the wastewater to form chloramines. As chlorine levels are depleted by disinfection and reaction, more chlorine is fed by the CF.

To determine the normalized transmembrane pressure of each filtration unit and the normalized permeate conductivity of each reverse osmosis unit, the wastewater treatment system depicted in FIG. 1 includes a number of sensors for measuring various properties of wastewater at various points in the system. Specifically, sensors are positioned and configured to measure the flow ("$F_0$"), temperature ("T"), and pressure ("$P_1$") of the wastewater on the feed side of the UF. On a permeate side of the UF and a feed side of the $RO_1$, sensors are positioned and configured to measure the pressure ("$P_2$") and conductivity ("$C_1$") of the wastewater. It is noted that separate pressure and conductivity sensors for the UF permeate and $RO_1$ feed can be used if the system includes features or is configured such that a single sensor cannot accurately determine the properties for both of the streams. On a permeate side of the $RO_1$ and a feed side of the $RO_2$, sensors are positioned and configured to measure the flow ("$F_1$"), pressure ("$P_3$"), and conductivity ("$C_2$") of the wastewater upstream of the $RL_1$. It is noted that separate flow, pressure, and conductivity sensors for the $RO_1$ permeate and $RO_2$ feed can be used if the system includes features or is configured such that a single sensor cannot accurately determine the properties for both of the streams. On a permeate side of the $RO_2$, sensors are positioned and configured to measure the flow ("$F_2$"), pressure ("$P_4$"), and conductivity ("$C_3$") of the wastewater upstream of the $RL_2$. The current draw ("i") and luminescence ("L") are measured for the bulb(s) in the UV. As mentioned above, the CL includes a chlorine sensor CS. If the system includes features or is otherwise configured such that $F_2$ does not accurately determine the final system flow, an additional flow sensor can be included to measure this flow. Additionally, while the system of FIGS. 1 and 3 includes a single temperature sensor T, multiple temperature sensors at various locations can be used if there is temperature fluctuation through the system.

Figure 2:
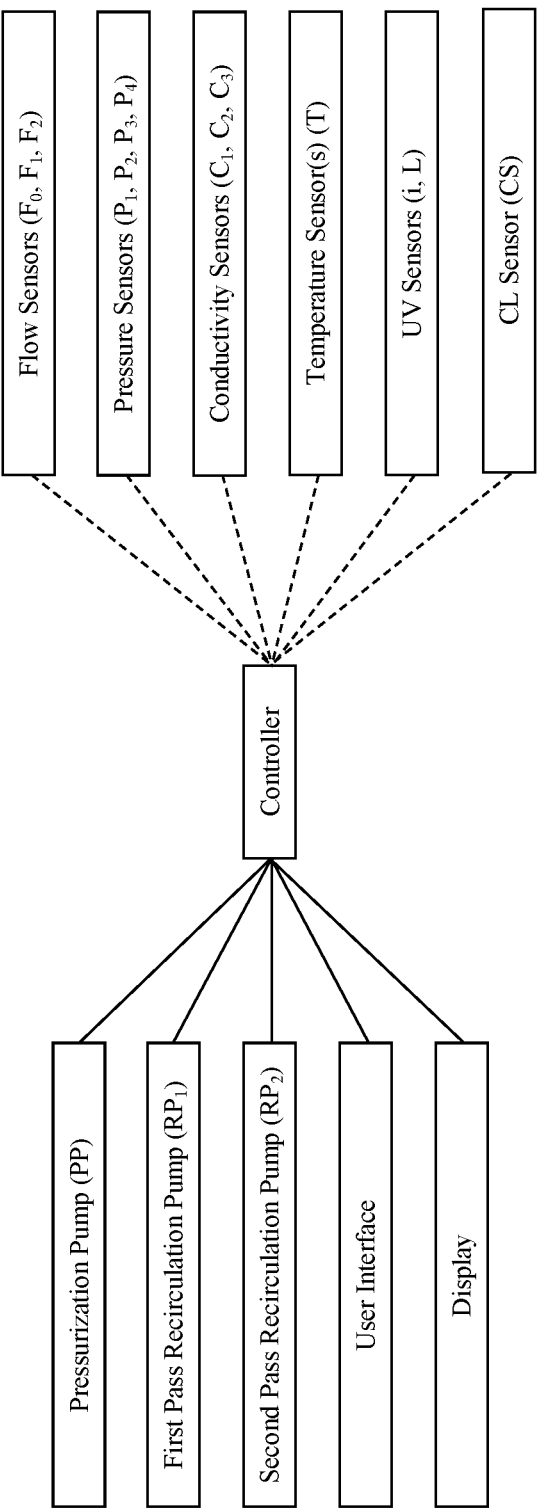
FIG. 2 shows a control system for controller a wastewater treatment system.

As shown in FIG. 2, the wastewater treatment system includes a controller configured to operate the PP, the $RP_1$, and the $RP_2$. The controller is also connected to a user interface and a display. A user can interact with the user interface to send information to the controller, and the controller can cause information about the system on the display. All of the above sensors are connected to the controller such that the measurements taken from the sensors are known by the controller. The controller is equipped with control logic such that it can determine the normalized transmembrane pressures of each filtration unit and normalized permeate conductivities of each reverse osmosis unit. In this regard, the performance of all the filtration units can be continuously measured based on these normalized properties.

The normalized transmembrane pressure of the UF is a function of $P_1$, $P_2$, $F_0$, and T. Specifically, the difference between the pressure measured by $P_2$ and $P_1$ is the transmembrane pressure. Because flow rate and temperature can also contribute to pressure changes, the transmembrane pressure is adjusted by the flow measured by $F_0$ in an inversely proportional manner and by the temperature measured by T in a directly proportional manner. This is because higher flows create high flux values and thus higher pressure values, and higher temperatures result in lower viscosities and thus lower pressure values.

The normalized permeate conductivity of the $RO_1$ is a function of $P_2$, $P_3$, $F_1$, T, $C_1$, and a conductivity of the $RL_1$ ("$C_{REC1}$"). The $C_{REC1}$ can either be measured by a sensor arranged in the $RL_1$ (FIG. 3), or can be estimated by a mass balance for the $RO_1$ using $F_0$, $F_1$, $F_{BLD1}$, $C_1$, and $C_2$ if there is no sensor arranged in the $RL_1$ (FIG. 1). Specifically, the difference between the pressure measured by $P_3$ and $P_2$ is the transmembrane pressure. Because osmotic pressure contributes to pressure changes through a membrane, an adjusted transmembrane pressure is determined from the difference between the measured transmembrane pressure and the osmotic pressure. The osmotic pressure is determined from the conductivity of wastewater on the feed side of the $RO_1$ downstream of $RL_1$, which can be determined by a determining the weighted average of $C_1$ and $C_{REC1}$. Specifically, the conductivity of wastewater on the feed side of the $RO_1$ downstream of $RL_1$ can be determined by $C_1$, $C_{REC1}$, $F_0$, and $F_1$. Because flow rate and temperature can also contribute to pressure changes, the adjusted transmembrane pressure is adjusted by the flow measured by $F_1$ in an inversely proportional manner and by the temperature measured by T in a directly proportional manner. This is because higher flows create high flux values and thus higher pressure values, and higher temperatures result in lower viscosities and thus lower pressure values.

The normalized permeate conductivity of the $RO_1$ which is a function of $C_2$, $F_1$, T, $C_1$, and $C_{REC1}$. Specifically, the permeate conductivity $C_2$ can be adjusted by the flow measured by $F_1$ in an inversely proportional manner, by the temperature measured by T in a directly proportional manner, and by the conductivity of wastewater on the feed side of the $RO_1$ downstream of $RL_1$, as determined from $C_1$, $C_{REC1}$, $F_0$, and $F_1$ as detailed above, in a directly proportional manner. This is because higher flows create high flux values which creates more permeate water to dilute the conductivity and thus lower conductivity values, higher temperatures result in an increase in the diffusion rate of ions across membranes resulting in higher conductivity values, and higher feed conductivity results in higher permeate conductivity.

The normalized permeate conductivity of the $RO_2$ is a function of $P_3$, $P_4$, $F_2$, T, $C_2$, and a conductivity of the $RL_2$ ("$C_{REC2}$"). The $C_{REC2}$ can either be measured by a sensor arranged in the $RL_2$ (FIG. 3), or can be estimated by a mass balance for the $RO_2$ using $F_1$, $F_2$, $F_{BLD2}$, $C_2$, and $C_3$ if no sensor is arranged in the $RL_2$ (FIG. 1). Specifically, the difference between the pressure measured by $P_4$ and $P_3$ is the transmembrane pressure. Because osmotic pressure contributes to pressure changes through a membrane, an adjusted transmembrane pressure is determined from the difference between the measured transmembrane pressure and the osmotic pressure. The osmotic pressure is determined from the conductivity of wastewater on the feed side of the $RO_2$ downstream of $RL_2$, which can be determined by a determining the weighted average of $C_2$ and $C_{REC2}$. Specifically, the conductivity of wastewater on the feed side of the $RO_2$ downstream of $RL_2$ can be determined by $C_2$, $C_{REC2}$, $F_1$, and $F_2$. Because flow rate and temperature can also contribute to pressure changes, the adjusted transmembrane pressure is adjusted by the flow measured by $F_2$ in an inversely proportional manner and by the temperature measured by T in a directly proportional manner. This is because higher flows create high flux values and thus higher pressure values, and higher temperatures result in lower viscosities and thus lower pressure values.

The normalized permeate conductivity of the $RO_2$ which is a function of $C_3$, $F_2$, T, $C_2$, and $C_{REC2}$. Specifically, the permeate conductivity $C_3$ can be adjusted by the flow measured by $F_2$ in an inversely proportional manner, by the temperature measured by T in a directly proportional manner, and by the conductivity of wastewater on the feed side of the $RO_2$ downstream of $RL_2$, as determined from $C_2$, $C_{REC2}$, $F_1$, and $F_2$ as detailed above, in a directly proportional manner. This is because higher flows create high flux values which creates more permeate water to dilute the conductivity and thus lower conductivity values, higher temperatures result in an increase in the diffusion rate of ions across membranes resulting in higher conductivity values, and higher feed conductivity results in higher permeate conductivity.

Once determined, the normalized transmembrane pressures are compared by the controller to an upper and lower limit for normalized transmembrane pressures. These upper and lower limits are determined based on an acceptable percentage changes (e.g., 15%) from the baseline transmembrane pressures. The baseline transmembrane pressure for each filtration unit is determined when the filtration unit is first installed. As discussed above, if influent water quality conditions substantially change, baseline transmembrane pressure should be reset. If a normalized transmembrane pressure is outside of the upper and lower limits, the controller can cease operating the PP, shutting down the system. When the system is shut down, the controller can issue a notification on the display screen that indicates that a normalized transmembrane pressure is either above the upper limit or below the lower limit so that a service person can be informed on how to address the issue. The notification can simply state what the issue is (e.g., the UF normalized transmembrane pressure is below the lower limit) or can provide suggestions on how to address the issue (e.g., check UF for integrity issues and consider replacing). Optionally, if a normalized transmembrane pressure is high, the controller can automatically performing a cleaning operation, such as a backwashing operation or a chemical cleaning operation, when the system is shut down and then resume normal operation once the cleaning operation is complete. The controller can include deadband settings, where a notification that there is a pending issue is issued once it is determined that a normalized transmembrane pressure is outside the upper and lower limits. If the normalized transmembrane pressure returns to within the upper and lower limits before the deadband timer is reached, the notification is removed. However, if the normalized transmembrane pressure remains outside the upper and lower limits when the deadband timer is reached, the system can be shut down and the appropriate cleaning operation and/or notification can be issued. The system can also be configured such that if a certain number of pending notifications are issued for a particular filtration unit over a specific time interval, the system can shut down as if the deadband timer was reached.

Similarly, the normalized permeate conductivities are compared by the controller to an upper limit for normalized permeate conductivities. These upper limits are determined based on acceptable percentage changes (e.g., 15%) from the baseline for normalized permeate conductivities. The baseline for normalized permeate conductivity for each reverse osmosis unit is determined when the filtration unit is first installed. As discussed above, if influent water quality conditions substantially change, baseline transmembrane pressure should be reset. If a normalized permeate conductivity is above the upper limit, the controller can cease operating the PP, shutting down the system. When the system is shut down, the controller can issue a notification on the display screen that indicates that a normalized permeate conductivity is above the upper limit so that a service person can be informed on how to address the issue. The notification can simply state what the issue is (e.g., the $RO_1$ normalized permeate conductivity is above the upper limit) or can provide suggestions on how to address the issue (e.g., check $RO_1$ for integrity issues and consider replacing). The controller can include deadband settings, where a notification that there is a pending issue is issued once it is determined that a normalized permeate conductivity is above the upper. If the normalized permeate conductivity returns to below the upper limit before the deadband timer is reached, the notification is removed. However, if the normalized permeate conductivity remains above the upper limit when the deadband timer is reached, the system can be shut down and the appropriate notification can be issued. The system can also be configured such that if a certain number of pending notifications are issued for a particular filtration unit over a specific time interval, the system can shut down as if the deadband timer was reached.

The performance of the UV bulb is based on i and L. The controller compares the measured i and L to upper and lower limits for these properties. If either of these properties is outside their respective upper and lower limits, the controller shuts down the system and issues a notification detailing why the system was shut down. The upper and lower limits for i and L can be determined when new UV bulb(s) are installed. The controller can implement a deadband timer on the measured properties of the UV.

As detailed above, the CF feeds chlorine in response to the chlorine levels detected by the CS. If the CS detects levels below the desired levels, the CF feeds chlorine. The controller can monitor the amount of chlorine fed by the CF over time to evaluate how much chlorine is required. If the feed rate of chlorine is higher than a predetermined threshold, it is assumed that excess ammonia is in the wastewater stream. Because ammonia should be removed via the advanced-filtration operations, it is assumed that there is an integrity issue in one or more of the filtration units if the chlorine feed rate is high. Accordingly, the controllers can shut down the PP if this occurs and issue a notification detailing why the system was shut down. The predetermined threshold for chlorine feed rate can be determined when any of the filtration units are first installed or replaced.

The sensors are configured to take measurements continuously while the system is operating. If any of the above-mentioned sensors of the system stop working, the controller can be configured to interpret the reading as being out of range. The controller will then assume the worst case reading for the sensor, which will likely result in a system shutdown due to a normalized property being outside its upper and lower limit.

The wastewater treatment system as detailed above can be utilized in a variety of ways, such as to provide potable wastewater to a building or to provide irrigation water. In certain applications, a particular system output might be necessary to meet water need requirements. For example, a household or office building would likely require a certain amount of potable water for its daily usage. Thus, the system can be designed such that pressurization pump automatically adjusts its output rate so that the system meets its output requirements. For example, in the systems detailed above in FIGS. 1-3, the motor speed of PP can controlled to maintain a set flow value for flow sensor $F_2$ or a final system flow sensor, if present.

In addition to the embodiment shown in FIGS. 1-3, the process for monitoring and controlling a wastewater filtration system described herein can be utilized in any existing wastewater treatment system that has one or more filtration units.

The invention claimed is:

1. A method of treating wastewater with a wastewater treatment system, the wastewater treatment system comprising:
  a wastewater source,
  a pressurization pump for pressurizing and pumping wastewater from the wastewater source,
  an ultrafiltration unit downstream of the pressurization pump having a feed side and a permeate side,
  a first pass reverse osmosis unit downstream of the ultrafiltration unit having a feed side, a permeate side, and a first pass recovery loop having a first recirculation pump that recirculates a first portion of concentrate to the feed side of the first pass reverse osmosis unit, and discharges a second portion of concentrate through a first pass bleed valve,
  a second pass reverse osmosis unit downstream of the first pass reverse osmosis unit having a feed side, a permeate side, and a second pass recovery loop having a second recirculation pump that recirculates a first portion of concentrate to the feed side of the second pass reverse osmosis unit, and discharges a second portion of concentrate through a second pass bleed valve;
  wherein the wastewater treatment system is configured such that the pressurization pump can feed through the ultrafiltration unit, the first pass reverse osmosis unit, and the second pass reverse osmosis unit without secondary pressurization pumps arranged downstream of the pressurization pump and upstream of the ultrafiltration unit, the first pass reverse osmosis unit, or the second pass reverse osmosis unit;

the method comprising:
  operating the pressurization pump to feed wastewater to the feed side of the ultrafiltration unit, though the ultrafiltration unit to the permeate side of the ultrafiltration unit, to the feed side of the first pass reverse osmosis unit, through the first pass reverse osmosis unit to the permeate side of the first pass reverse osmosis unit, to the feed side of the second pass reverse osmosis unit, through the second pass reverse osmosis unit to the permeate side of the second pass reverse osmosis unit to produce treated wastewater without secondary pressurization pumps arranged downstream of the pressurization pump and upstream of the ultrafiltration unit, the first pass reverse osmosis unit, and the second pass reverse osmosis unit,
  inputting a desired flow rate for wastewater on a permeate side of the second pass reverse osmosis unit, the pressurization pump operating to pump the wastewater through the wastewater treatment system such that the desired flow rate for wastewater on the permeate side of the second pass reverse osmosis unit is achieved,
  continuously determining a normalized transmembrane pressure through the ultrafiltration unit, a normalized transmembrane pressure through the first pass reverse osmosis unit, and a normalized transmembrane pressure through the second pass reverse osmosis unit while the pressurization pump is operated,
  continuously comparing the normalized transmembrane pressure through the ultrafiltration unit to an upper and lower limit for normalized transmembrane pressure through the ultrafiltration unit, the normalized transmembrane pressure through the first pass reverse osmosis unit to an upper and lower limit for normalized transmembrane pressure through the first pass reverse osmosis unit, and the normalized transmembrane pressure through the second pass reverse osmosis unit to an upper and lower limit for normalized transmembrane pressure through the second pass reverse osmosis unit while the pressurization pump is being operated, continuing the operation of the pressurization pump if the normalized transmembrane pressure through the ultrafiltration unit is within the upper and lower limit for normalized transmembrane pressure through the ultrafiltration unit, if the normalized transmembrane pressure through the first pass reverse osmosis unit is within the upper and lower limit for normalized transmembrane pressure through the first pass reverse osmosis unit, and if the normalized transmembrane pressure through the second pass reverse osmosis unit is within the upper and lower limit for normalized transmembrane pressure through the second pass reverse osmosis unit, ceasing the operation of the pressurization pump if the normalized transmembrane pressure through the ultrafiltration unit is outside the upper and lower limit for normalized transmembrane pressure through the ultrafiltration unit, if the normalized transmembrane pressure through the first pass reverse osmosis unit is outside the upper and lower limit for normalized transmembrane pressure through the first pass reverse osmosis unit, or if the normalized transmembrane pressure through the second pass reverse osmosis unit is outside the upper and lower limit for normalized transmembrane pressure through the second pass reverse osmosis unit.

2. The method of claim 1, the wastewater treatment system further comprising:

a first pressure sensor on the feed side of the ultrafiltration unit, a second pressure sensor on the permeate side of the ultrafiltration unit, a flow sensor on the feed side of the ultrafiltration unit, a temperature sensor on the feed side or the permeate side of the ultrafiltration unit, wherein determining the normalized transmembrane pressure through the ultrafiltration unit comprises:

the first pressure sensor measuring the pressure of wastewater on the feed side of the ultrafiltration unit, the second pressure sensor measuring the pressure of wastewater on the permeate side of the ultrafiltration unit, the flow sensor measuring the flow rate of wastewater on the feed side of the ultrafiltration unit, the temperature sensor measuring the temperature of the wastewater on the feed side or the permeate side of the ultrafiltration unit, determining a transmembrane pressure for the ultrafiltration unit by calculating the difference between the pressure measured by the first pressure sensor and the pressure measured by the second pressure sensor, adjusting the transmembrane pressure based on the flow rate measured by the first flow sensor in an inversely proportional manner, and based on the temperature measured by the temperature sensor in a directly proportional manner.

3. The method of claim 1, the wastewater treatment system further comprising:

a first pressure sensor on the feed side of the first pass reverse osmosis unit upstream of the first pass recovery loop, a second pressure sensor on the permeate side of the first pass reverse osmosis unit, a first flow sensor on the feed side of the first pass reverse osmosis unit upstream of the first pass recovery loop, a second flow sensor on the permeate side of the first pass reverse osmosis unit, a first conductivity sensor on the feed side of the first pass reverse osmosis unit upstream of the first pass recovery loop, a second conductivity sensor either:
 a) within the first pass recovery loop, or
 b) on the permeate side of the first pass reverse osmosis unit, a temperature sensor on the feed side or the permeate side of the first pass reverse osmosis unit, determining the normalized transmembrane pressure through the first pass reverse osmosis unit comprising:

the first pressure sensor measuring the pressure of wastewater on the feed side of the first pass reverse osmosis unit upstream of the first pass recovery loop, the second pressure sensor measuring the pressure of wastewater on the permeate side of the first pass reverse osmosis unit, the first flow sensor measuring the flow rate of wastewater on the feed side of the first pass reverse osmosis unit upstream of the first pass recovery loop, the second flow sensor measuring the flow rate of wastewater on the permeate side of the first pass reverse osmosis unit, the first conductivity sensor measuring the conductivity of wastewater on the feed side of the first pass reverse osmosis unit upstream of the first pass recovery loop, the second conductivity sensor measuring the conductivity of wastewater either:
 a) within the first pass recovery loop, or
 b) on the permeate side of the first pass reverse osmosis unit, the temperature sensor measuring the temperature of wastewater on the feed side or the permeate side of the first pass reverse osmosis unit, determining a transmembrane pressure for the first pass reverse osmosis unit by calculating the difference between the pressure measured by the first pressure sensor and the pressure measured by the second pressure sensor, determining a conductivity of wastewater on the feed side of the first pass reverse osmosis unit downstream of the first pass recovery loop from the flow rate measured by the first flow sensor, the conductivity measured by the first conductivity sensor, a flow rate of wastewater recirculated by the first pass recovery loop, and the conductivity of wastewater in the first pass recovery loop:
 a) as measured by the second conductivity sensor if arranged in the first pass recovery loop or,
 b) as estimated from the flow rate measured by the first flow sensor, the flow rate measured by the second flow sensor, a flow rate bled through the first pass bleed valve, the conductivity measured by the first conductivity sensor, and the conductivity measured by the second conductivity sensor if arranged on the permeate side of the first pass reverse osmosis unit, determining the osmotic pressure of the first pass reverse osmosis unit from the conductivity of wastewater on the feed side of the first pass reverse osmosis unit downstream of the first pass recovery loop, determining an adjusted transmembrane pressure for the first pass reverse osmosis unit by calculating the difference between the transmembrane pressure for the first pass reverse osmosis unit and the osmotic pressure of the first pass reverse osmosis unit, adjusting the adjusted transmembrane pressure for the first pass reverse osmosis unit based on the flow rate measured by the second flow sensor in an inversely proportional manner, and based on the temperature measured by the temperature sensor in a directly proportional manner.

4. The method of claim 1, the wastewater treatment system further comprising:
a first pressure sensor on the feed side of the second pass reverse osmosis unit upstream of the second pass recovery loop,
a second pressure sensor on the permeate side of the second pass reverse osmosis unit,
a first flow sensor on the feed side of the second pass reverse osmosis unit upstream of the second pass recovery loop,
a second flow sensor on the permeate side of the second pass reverse osmosis unit,
a first conductivity sensor on the feed side of the second pass reverse osmosis unit upstream of the second pass recovery loop,
a second conductivity sensor either:
  a) within the second pass recovery loop, or
  b) on the permeate side of the second pass reverse osmosis unit,
a temperature sensor on the feed side or the permeate side of the second pass reverse osmosis unit,
determining the normalized transmembrane pressure through the second pass reverse osmosis unit comprising:
the first pressure sensor measuring the pressure of wastewater on the feed side of the second pass reverse osmosis unit upstream of the second pass recovery loop,
the second pressure sensor measuring the pressure of wastewater on the permeate side of the second pass reverse osmosis unit,
the first flow sensor measuring the flow rate of wastewater on the feed side of the second pass reverse osmosis unit upstream of the second pass recovery loop,
the second flow sensor measuring the flow rate of wastewater on the permeate side of the second pass reverse osmosis unit,
the first conductivity sensor measuring the conductivity of wastewater on the feed side of the second pass reverse osmosis unit upstream of the second pass recovery loop,
the second conductivity sensor measuring the conductivity of wastewater either:
  a) within the second pass recovery loop, or
  b) on the permeate side of the second pass reverse osmosis unit,
the temperature sensor measuring the temperature of wastewater on the feed side or the permeate side of the second pass reverse osmosis unit,
determining a transmembrane pressure for the second pass reverse osmosis unit by calculating the difference between the pressure measured by the first pressure sensor and the pressure measured by the second pressure sensor,
determining conductivity of wastewater on the feed side of the second pass reverse osmosis unit downstream of the second pass recovery loop from the flow rate measured by the first flow sensor, the conductivity measured by the first conductivity sensor, a flow rate of wastewater recirculated by the second pass recovery loop, and the conductivity of wastewater in the second pass recovery loop:
  a) as measured by the second conductivity sensor if arranged in the second pass recovery loop or,
  b) as estimated from the flow rate measured by the first flow sensor, the flow rate measured by the second flow sensor, a flow rate bled through the second pass bleed valve, the conductivity measured by the first conductivity sensor, and the conductivity measured by the second conductivity sensor if arranged on the permeate side of the second pass reverse osmosis unit,
determining the osmotic pressure of the second pass reverse osmosis unit from the conductivity of wastewater on the feed side of the second pass reverse osmosis unit downstream of the second pass recovery loop,
determining an adjusted transmembrane pressure for the second pass reverse osmosis unit by calculating the difference between the transmembrane pressure for the second pass reverse osmosis unit and the osmotic pressure of the second pass reverse osmosis unit,
adjusting the adjusted transmembrane pressure for the second pass reverse osmosis unit based on the flow rate measured by the third flow sensor in an inversely proportional manner, and based on the temperature measured by the temperature sensor in a directly proportional manner.

5. The method of claim 1, the method further comprising:
determining that the normalized pressure through any of the ultrafiltration unit, the first pass reverse osmosis unit, and the second pass reverse osmosis unit is below the lower limit,
issuing a notification indicating that the normalized transmembrane pressure through at least one of the ultrafiltration unit, the first pass reverse osmosis unit, and the second pass reverse osmosis unit is below the lower limit.

6. The method of claim 1, the method comprising:
determining that the normalized pressure through any of the ultrafiltration unit, the first pass reverse osmosis unit, and the second pass reverse osmosis unit is above the upper limit,
performing a cleaning operation on at least one of the ultrafiltration unit, the first pass reverse osmosis unit, and the second pass reverse osmosis unit and/or issuing a notification indicating that the normalized transmembrane pressure through at least one of the ultrafiltration unit, the first pass reverse osmosis unit, and the second pass reverse osmosis unit is above the upper limit.

7. The method of claim 1, the upper and lower limits for normalized transmembrane pressure of the ultrafiltration unit, the first pass reverse osmosis unit, and the second pass reverse osmosis unit being determined from baseline transmembrane pressures of the ultrafiltration unit, the first pass reverse osmosis unit, and the second pass reverse osmosis unit, respectively.

8. The method of claim 1, the wastewater treatment system further comprising:
an ultraviolet-light unit downstream of the second pass reverse osmosis unit comprising one or more ultraviolet bulbs;
the method further comprising:
continuously determining the current draw of the ultraviolet bulb(s) and the luminescence of the ultraviolet bulb(s) while the pressurization pump is operated, comparing the current draw of the ultraviolet bulb(s) to an upper and lower limit for current draw of the ultraviolet bulb(s) and the luminescence of the ultraviolet bulb(s) to an upper and lower limit for the luminescence of the ultraviolet bulb(s), continuing the operation of the pump if the current draw of the ultraviolet bulb(s) is within the upper and lower limit for current draw of the ultraviolet bulb(s) and if the luminescence of the ultraviolet bulb(s) is within the upper and lower limit for the luminescence of the ultraviolet bulb(s) while operating, ceasing the operation of the pump if the current draw of the ultraviolet bulb(s) is outside the upper and lower limit for current draw of the ultraviolet bulb(s) or if the luminescence of the ultraviolet bulb(s) is outside the upper and lower limit for the luminescence of the ultraviolet bulb(s).

9. The method of claim 1, the wastewater treatment system further comprising:
a chlorine feeder downstream of the second pass reverse osmosis unit configured to feed chlorine into the wastewater,
a chlorine sensor arranged downstream of the chlorine feeder configured to measure chlorine levels within the wastewater;
the method further comprising:
operating the chlorine feeder to feed chlorine into the wastewater such that a predetermined chlorine level is detected by the chlorine sensor,
monitoring the amount of chlorine fed by the chlorine feeder over a time interval and comparing the amount of chlorine fed over the time interval to an upper limit for chlorine fed over the time interval,
ceasing operation of the pressurization pump if the amount of chlorine fed over the time interval is above the upper limit.

10. A method of treating wastewater with a wastewater treatment system,
the wastewater treatment system comprising:
a wastewater source,
a pressurization pump for pressurizing and pumping wastewater from the wastewater source,
an ultrafiltration unit downstream of the pressurization pump having a feed side and a permeate side,
a first pass reverse osmosis unit downstream of the ultrafiltration unit having a feed side, a permeate side, and a first pass recovery loop having a first recirculation pump that recirculates a first portion of concentrate to the feed side of the first pass reverse osmosis unit, and discharges a second portion of concentrate through a first pass bleed valve,
a second pass reverse osmosis unit downstream of the first pass reverse osmosis unit having a feed side, a permeate side, and a second pass recovery loop having a second recirculation pump that recirculates a first portion of concentrate to the feed side of the second pass reverse osmosis unit, and discharges a second portion of concentrate through a second pass bleed valve;
wherein the wastewater treatment system is configured such that the pressurization pump can feed through the ultrafiltration unit, the first pass reverse osmosis unit, and the second pass reverse osmosis unit without secondary pressurization pumps arranged downstream of the pressurization pump and upstream of the ultrafiltration unit, the first pass reverse osmosis unit, or the second pass reverse osmosis unit;

the method comprising:
operating the pressurization pump to feed wastewater to the feed side of the ultrafiltration unit, though the ultrafiltration unit to the permeate side of the ultrafiltration unit, to the feed side of the first pass reverse osmosis unit, through the first pass reverse osmosis unit to the permeate side of the first pass reverse osmosis unit, to the feed side of the second pass reverse osmosis unit, through the second pass reverse osmosis unit to the permeate side of the second pass reverse osmosis unit to produce treated wastewater without secondary pressurization pumps arranged downstream of the pressurization pump and upstream of the ultrafiltration unit, the first pass reverse osmosis unit, and the second pass reverse osmosis unit, inputting a desired flow rate for wastewater on the permeate side of the second pass reverse osmosis unit, the pressurization pump operating to pump the wastewater through the wastewater treatment system to achieve the desired flow rate for wastewater on the permeate side of the second pass reverse osmosis unit, continuously determining a normalized permeate conductivity of the first reverse osmosis unit, and a normalized permeate conductivity of the second pass reverse osmosis unit while the pressurization pump is operated, continuously comparing the normalized permeate conductivity of the first reverse osmosis unit to an upper and lower limit normalized permeate conductivity of the first reverse osmosis unit, and the normalized permeate conductivity of the second pass reverse osmosis unit an upper and lower limit for normalized permeate conductivity of the second pass reverse osmosis unit, continuing the operation of the pump if the normalized permeate conductivity of the first reverse osmosis unit is below the upper limit for normalized permeate conductivity of the first reverse osmosis unit, and if the normalized permeate conductivity of the second pass reverse osmosis unit is below the upper limit for normalized permeate conductivity of the second pass reverse osmosis unit, ceasing the operation of the pump if the normalized permeate conductivity of the first reverse osmosis unit if above the upper limit for normalized permeate conductivity of the first reverse osmosis unit, or if the normalized permeate conductivity of the second pass reverse osmosis unit is above the upper limit for normalized permeate conductivity of the second pass reverse osmosis unit.

11. The method of claim 10, the wastewater treatment system further comprising:
a first conductivity sensor on the feed side of the first pass reverse osmosis unit upstream of the first pass recovery loop,
a second conductivity sensor on the permeate side of the first pass reverse osmosis unit,
a first flow sensor on the feed side of the first pass reverse osmosis unit upstream of the first pass recovery loop,
a second flow sensor on the permeate side of the first pass reverse osmosis unit,
a temperature sensor on the feed side or the permeate side of the first pass reverse osmosis unit,
optionally, a third conductivity sensor in the first pass recovery loop, determining the normalized permeate conductivity of the first pass reverse osmosis unit comprising:
the first conductivity sensor measuring the conductivity of wastewater on the feed side of the first pass reverse osmosis unit upstream of the first pass recovery loop,
the second conductivity sensor measuring the conductivity of wastewater on the permeate side of the first pass reverse osmosis unit,
the first flow sensor measuring the flow rate of wastewater on the feed side of the first pass reverse osmosis unit upstream of the first pass recovery loop,
the second flow sensor measuring the flow rate of wastewater on the permeate side of the first pass reverse osmosis unit,
the temperature sensor measuring the temperature of wastewater on the feed side or the permeate side of the first pass reverse osmosis unit,
determining a conductivity of wastewater on the feed side of the first pass reverse osmosis unit downstream of the first pass recovery loop from the flow rate measured by the first flow sensor, the conductivity measured by the first conductivity sensor, a flow rate of wastewater recirculated by the first pass recovery loop, and the conductivity of wastewater in the first pass recovery loop which is determined by:
a) the third conductivity sensor measuring the conductivity of wastewater in the first pass recovery loop, or
b) estimation from the flow rate measured by the first flow sensor, the flow rate measured by the second flow sensor, a flow rate bled through the first pass bleed valve, the conductivity measured by the first conductivity sensor, and the conductivity measured by the second conductivity sensor,
adjusting the conductivity measured by the second conductivity sensor based on temperature measured by the temperature sensor in a directly proportional manner, the flow rate measured by the second flow sensor in an inversely proportional manner, and the conductivity of wastewater on the feed side of the first pass reverse osmosis unit downstream of the first pass recovery loop in a directly proportional manner.

12. The method of claim 10, the wastewater treatment system further comprising:
a first conductivity sensor on the feed side of the second pass reverse osmosis unit upstream of the second pass recovery loop,
a second conductivity sensor on the permeate side of the second pass reverse osmosis unit,
a first flow sensor on the feed side of the second pass reverse osmosis unit upstream of the second pass recovery loop,
a second flow sensor on the permeate side of the second pass reverse osmosis unit,
a temperature sensor on the feed side or the permeate side of the second pass reverse osmosis unit,
optionally, a third conductivity sensor in the second pass recovery loop,
determining the normalized permeate conductivity of the second pass reverse osmosis unit comprising:
the first conductivity sensor measuring the conductivity of wastewater on the feed side of the second pass reverse osmosis unit upstream of the second pass recovery loop,
the second conductivity sensor measuring the conductivity of wastewater on the permeate side of the second pass reverse osmosis unit,
the first flow sensor measuring the flow rate of wastewater on the feed side of the second pass reverse osmosis unit upstream of the second pass recovery loop,
the second flow sensor measuring the flow rate of wastewater on the permeate side of the second pass reverse osmosis unit,
the temperature sensor measuring the temperature of wastewater on the feed side or the permeate side of the second pass reverse osmosis unit,
determining a conductivity of wastewater on the feed side of the second pass reverse osmosis unit downstream of the second pass recovery loop from the flow rate measured by the first flow sensor, the conductivity measured by the first conductivity sensor, a flow rate of wastewater recirculated by the first pass recovery loop, and the conductivity of wastewater in the second pass recovery loop which is determined by:
a) the third conductivity sensor measuring the conductivity of wastewater in the second pass recovery loop, or
b) estimation from the flow rate measured by the first flow sensor, the flow rate measured by the second flow sensor, a flow rate bled through the second pass bleed valve, the conductivity measured by the first conductivity sensor, and the conductivity measured by the second conductivity sensor,
adjusting the conductivity measured by the second conductivity sensor based on temperature measured by the temperature sensor in a directly proportional manner, the flow rate measured by the second flow sensor in an inversely proportional manner, and the conductivity of wastewater on the feed side of the second pass reverse osmosis unit downstream of the second pass recovery loop in a directly proportional manner.

13. The method of claim 10, the method comprising:
determining the normalized permeate conductivity of the first reverse osmosis unit, or the normalized permeate conductivity of the second pass reverse osmosis unit is higher than the upper limit,
issuing a notification indicating that the normalized permeate conductivity of the ultrafiltration unit, the normalized permeate conductivity of the first reverse osmosis unit, or the normalized permeate conductivity of the second pass reverse osmosis unit is higher than the upper limit.

14. The method of claim 10, the upper limits for the first reverse osmosis unit, and the second pass reverse osmosis unit being determined from baseline normalized permeate conductivities of the ultrafiltration unit the first reverse osmosis unit, and the second pass reverse osmosis unit, respectively.

15. The method of claim 10, the wastewater treatment system further comprising:
an ultraviolet-light unit downstream of the second pass reverse osmosis unit comprising one or more ultraviolet bulbs;
the method further comprising:
continuously determining the current draw of the ultraviolet bulb(s) and the luminescence of the ultraviolet bulb(s) while the pressurization pump is operated,
comparing the current draw of the ultraviolet bulb(s) to an upper and lower limit for current draw of the ultraviolet bulb(s) and the luminescence of the ultraviolet bulb(s) to an upper and lower limit for the luminescence of the ultraviolet bulb(s),
continuing the operation of the pump if the current draw of the ultraviolet bulb(s) is within the upper and lower limit for current draw of the ultraviolet bulb(s) and if the luminescence of the ultraviolet bulb(s) is within the upper and lower limit for the luminescence of the ultraviolet bulb(s) while operating, ceasing the operation of the pump if the current draw of the ultraviolet bulb(s) is outside the upper and lower limit for current draw of the ultraviolet bulb(s) or if the luminescence of the ultraviolet bulb(s) is outside the upper and lower limit for the luminescence of the ultraviolet bulb(s).

16. The method of claim 10, the wastewater treatment system further comprising:

a chlorine feeder downstream of the second pass reverse osmosis unit configured to feed chlorine into the wastewater, a chlorine sensor arranged downstream of the chlorine feeder configured to measure chlorine levels within the wastewater;

the method further comprising:

operating the chlorine feeder to feed chlorine into the wastewater such that a predetermined chlorine level is detected by the chlorine sensor, monitoring the amount of chlorine fed by the chlorine feeder over a time interval and comparing the amount of chlorine fed over the time interval to an upper limit for chlorine fed over the time interval, ceasing operation of the pressurization pump if the amount of chlorine fed over the time interval is above the upper limit.

\* \* \* \* \*